United States Patent
Tudosoiu (10) Patent No.: US 9,304,608 B2
(45) Date of Patent: Apr. 5, 2016

(54) STYLUS DEVICE

(75) Inventor: Bogdan Ionut Tudosoiu, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 165 days.

(21) Appl. No.: 13/330,816

(22) Filed: Dec. 20, 2011

(65) Prior Publication Data
US 2013/0154956 A1    Jun. 20, 2013

(51) Int. Cl.
  G06F 3/041   (2006.01)
  G06F 3/0354  (2013.01)
  G10L 15/26   (2006.01)

(52) U.S. Cl.
  CPC ............ G06F 3/03545 (2013.01); G10L 15/26 (2013.01)

(58) Field of Classification Search
  CPC ........... G09G 5/00; H03K 17/94; H04R 3/00; G06F 15/16; G06F 3/041; G06F 3/03545; H04W 8/00; H01L 15/26
  USPC ........ 395/106, 112, 825; 364/709.01, 709.11; 341/20; 345/179, 467, 173; 178/18.01, 178/18.03, 19.01
  See application file for complete search history.

(56) References Cited

U.S. PATENT DOCUMENTS

| | | | |
|---|---|---|---|
| 5,581,783 A * | 12/1996 | Ohashi | 710/5 |
| 6,002,387 A * | 12/1999 | Ronkka et al. | 345/157 |
| 6,563,494 B1 | 5/2003 | Eichstaedt et al. | |
| 6,956,564 B1 * | 10/2005 | Williams | 345/179 |
| 2003/0038790 A1 | 2/2003 | Koyama et al. | |
| 2007/0005849 A1 | 1/2007 | Oliver | |
| 2009/0135153 A1 * | 5/2009 | Narusawa | 345/173 |
| 2009/0251337 A1 * | 10/2009 | Marggraff et al. | 341/20 |
| 2012/0098835 A1 * | 4/2012 | Sorihashi | 345/467 |
| 2013/0091238 A1 * | 4/2013 | Liu et al. | 709/217 |

FOREIGN PATENT DOCUMENTS

EP    1426855    6/2004

OTHER PUBLICATIONS

European search report issued Aug. 30, 2012.
European examination report issued Mar. 25, 2014.
China Office Action issued Oct. 26, 2015.

* cited by examiner

*Primary Examiner* — Lun-Yi Lao
*Assistant Examiner* — Johny Lau
(74) *Attorney, Agent, or Firm* — McClure, Qualey & Rodack, LLP (57) ABSTRACT

Various embodiments for inserting data are disclosed. One embodiment is a system that comprises a stylus device and a computing device. The stylus device comprises an input device configured to capture data, memory configured to store the captured data, and logic for transmitting the stored data. The computing device comprises a touchscreen display, a stylus interface for receiving the transmitted capture data, and an application executable in the computing device, where the application comprises logic that inserts the data received by the stylus interface on the touchscreen display.

17 Claims, 11 Drawing Sheets

STYLUS DEVICE

BACKGROUND

With the rapid development in communications technology, mobile devices have become an integral part of many people's lives given the portability and the growing number of applications available on mobile devices. Today, individuals can perform a wide range of functions including, for example, playing music, viewing photos, social networking, editing documents, etc. via mobile devices. There is an ever-increasing desire to increase the functionality and efficiency of operating mobile devices.

SUMMARY

Briefly described, one embodiment, among others, is a system that comprises a stylus device and a computing device. The stylus device comprises an input device configured to capture data, memory configured to store the captured data, and logic for transmitting the stored data. The computing device comprises a touchscreen display, a stylus interface for receiving the transmitted capture data, and an application executable in the computing device, where the application comprises logic that inserts the data received by the stylus interface on the touchscreen display.

Another embodiment is a method for inserting data into content displayed on a touchscreen device of a computing device. The method comprises capturing, by a stylus device, data and storing the capture data in a memory in the stylus device. The method further comprises determining, by the computing device, an insertion point based on contact by the stylus device with the touchscreen device and downloading, by the computing device, data from the memory in the stylus device. The method further comprises displaying, by the computing device, the downloaded data in the content according to the insertion point.

Another embodiment is a system that comprises a stylus device and a computing device. The stylus device comprises an input device configured to capture data, wherein the data comprises at least one of: speech input, a digital image, and video. The stylus device further comprises memory configured to store the captured data, logic for generating an index of the captured data, and logic for transmitting the stored data. The computing device comprises a touchscreen display, a stylus interface for establishing a wireless connection with the stylus device, the stylus interface further configured to receive the transmitted capture data.

The computing device further comprises an application executable in the computing device, where the application comprises logic that generates a user interface on the touchscreen display according to the index and logic that inserts the data received by the stylus interface on the touchscreen display inserts the data according to a selection received via the user interface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

With the rapid development in communications technology, mobile devices have become an integral part of many people's lives given the portability and the growing number of applications available on mobile devices such as smartphones and tablets. Today, individuals can perform a wide range of functions such as playing music, viewing photos, social networking, editing documents, etc. via mobile devices.

Various embodiments are disclosed for an enhanced stylus device configured to capture and transmit data to a mobile device for live editing and data entry. In the following discussion, a general description of the system and its components is provided, followed by a discussion of the operation of the same.

Figure 1:
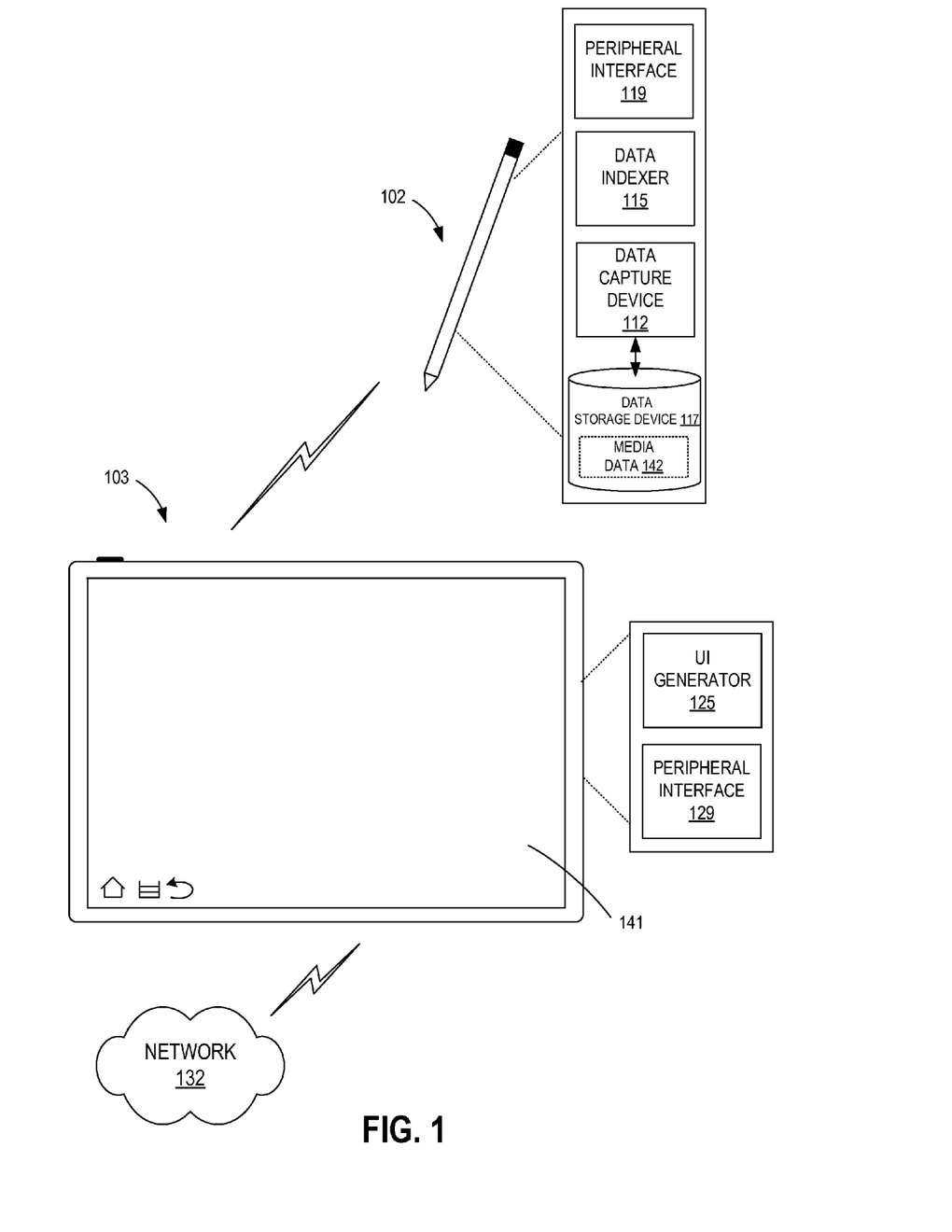
FIG. 1 is a block diagram of an environment in which embodiments of a stylus device may be implemented.

FIG. 1 is a block diagram of a stylus device 102 in which embodiments for handling incoming calls disclosed herein may be implemented. The stylus device 102 may be embodied, for example, as a handheld computing device or other computing platform implemented in a pointing device. Applications and/or other functionality may be executed in the stylus device 102 according to various embodiments. The components executed on the stylus device 102 include, for example, a data capture device 112, a data indexer 115, a peripheral interface 119, and other applications, services, processes, systems, engines, or functionality not discussed in detail herein.

The data capture device 112 is executed to facilitate the capture of data such as, but not limited to, audio content, video content, digital images, and so on, where the data capture device 112 may include such integrated hardware as a microphone and/or a digital camera. The data capture device 112 is further configured to store the captured data in a data storage device 117 implemented in the stylus device 102.

The data indexer 115 is executed to facilitate indexing of the media data 142 stored in the data storage device 117. Based on the index information maintained by the data indexer 115, a user selects content in the stored media data 142 to transmit to a computing device 103. Specifically, the data indexer 115 receives the user's selection relating to which data to retrieve from the data storage device 117.

The peripheral interface 119 in the stylus device 102 is executed to facilitate communications with other devices such as the computing device 103. As shown, the peripheral interface 119 may be executed to establish a wireless connection between the stylus device 102 and the computing device 103, where the wireless connection may comprise, for example, a Bluetooth® connection, an IEEE 802.11 connection, a UWB (ultra-wideband) connection, a ZigBee connection, and so on. Through the peripheral interface 119, the data selected by the user is transmitted to the computing device 103.

The computing device 103 shown in FIG. 1 may be embodied as a tablet, smartphone, or other computing device and includes a touchscreen display 141. The computing device 103 includes a UI generator 125 executed to facilitate the selection of content by generating a selection component listing relating to the media data 142 stored in the data storage device 117 of the stylus device 102. The selection component may be generated according to an index maintained by the data indexer 115.

The computing device 103 also includes a peripheral interface 129 executed to facilitate communications with other devices such as the stylus device 102. As shown, the computing device 103 may also be coupled to a network 132 such as the Internet through a wireless connection through which the computing device 103 updates web pages based on data retrieved from the stylus device 102.

Figure 2:
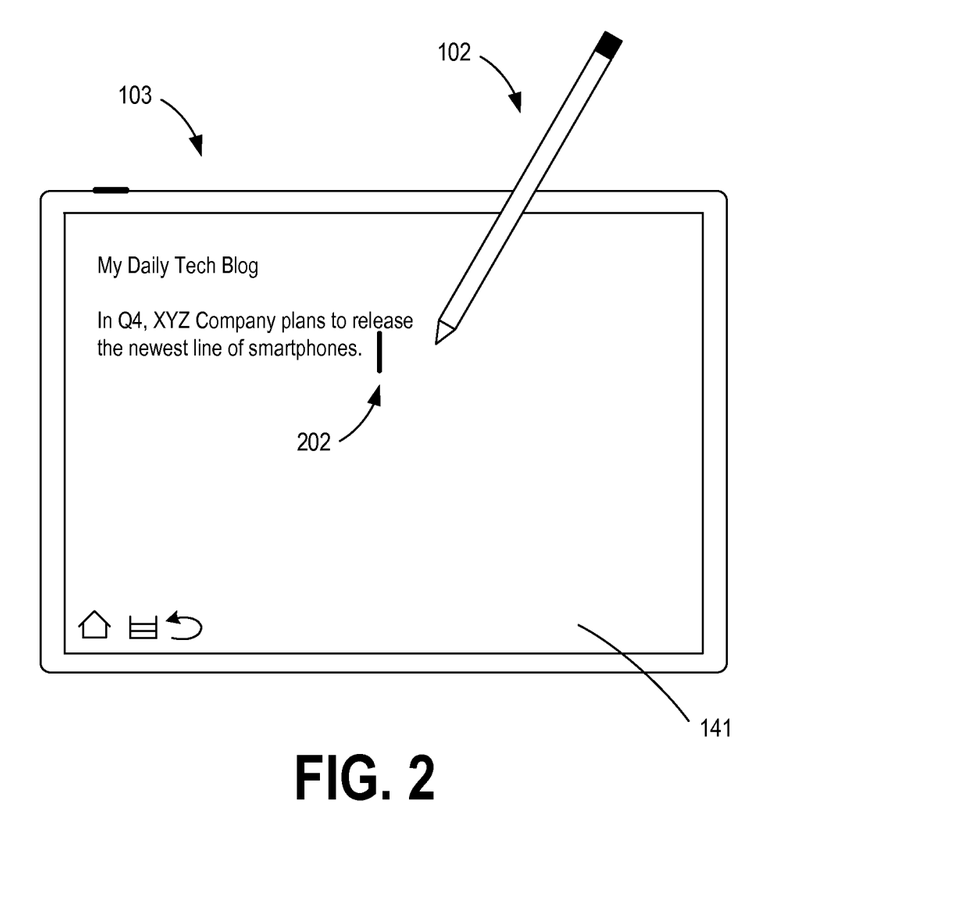
FIG. 2 illustrates an example application of the stylus device 102 depicted in FIG. 1.

Reference is made to FIG. 2, which illustrates an example application of the stylus device 102 depicted in FIG. 1. As shown, the touchscreen display 141 of the computing device 103 displays content from a web page where the content relates to, for example, a blog post, a social networking site, or other type of web site. In the non-limiting example shown, the computing device 103 displays a blog post, which a user is editing. Note that the data insertion techniques disclosed herein may also be applied to the editing of documents stored locally on the computing device 103.

Through the stylus device 102, the user specifies an insertion point 202 via the touchscreen display 141 of the computing device 103. The insertion point 202 specifies the location for inserting media data 142 (FIG. 1) stored in the data storage device 117 (FIG. 1) of the stylus device 102. The user simply taps on the touchscreen display 141 using the stylus device 102 to specify the insertion point 202.

Figure 3:
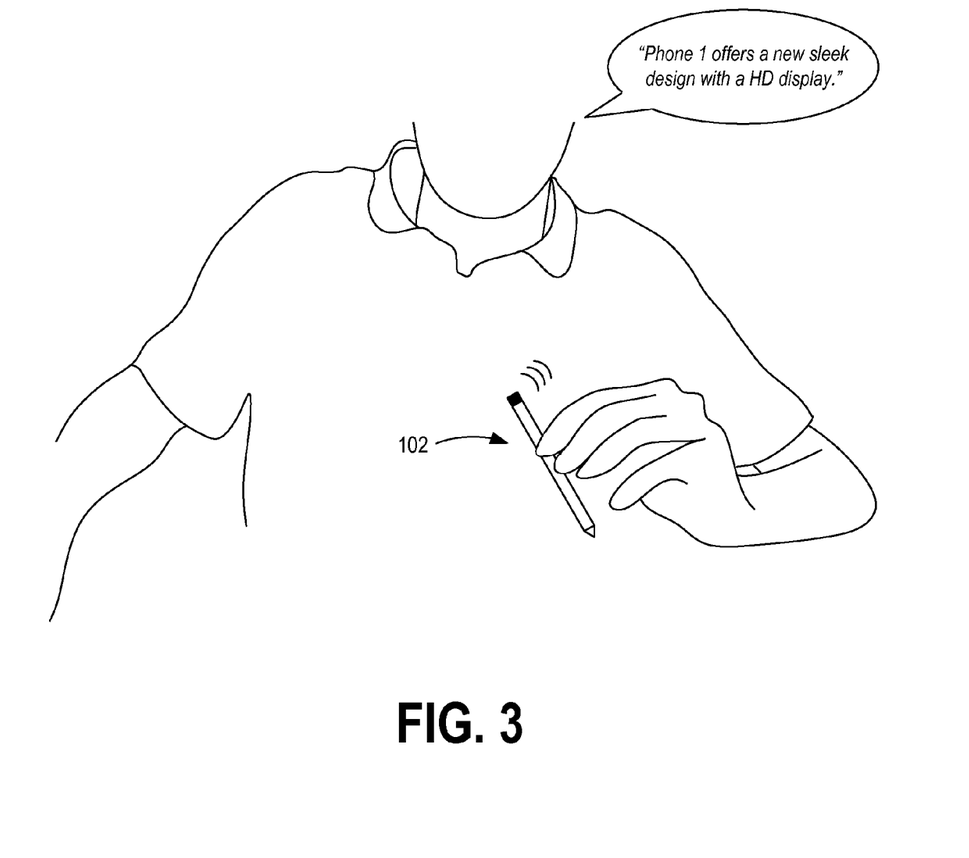
FIG. 3 is an example of a data capture operation performed during execution of the data capture device in the stylus device of FIG. 1 according to various embodiments of the present disclosure.

Turning now to FIG. 3, shown is an example of a data capture operation performed during execution of the data capture device 112 (FIG. 1) in the stylus device 102. As described above, the data capture device 112 may include such hardware as a microphone and/or a digital camera capable of capturing both audio and video content. For some embodiments, the data capture device 112 further comprises transcription logic for converting human speech into text transcript, where the text transcript is stored in the data storage device 117 (FIG. 1). In the non-limiting example shown, the user dictates a sentence that the user wishes to insert into a blog post. The data capture device 112 in the stylus device 102 captures the sentence and transcribes the sentence, which may then be transmitted by the stylus device 102 to the computing device 103 via the peripheral interfaces 119, 129 (FIG. 1).

Figure 4:
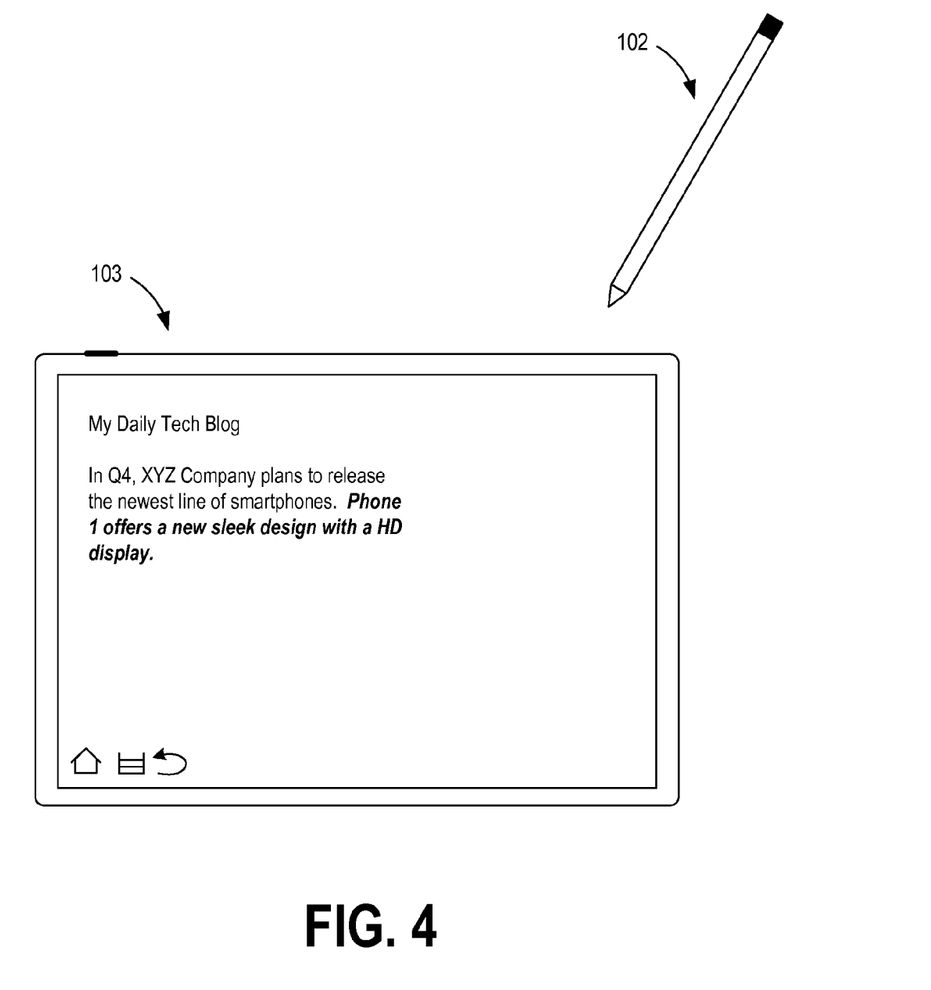
FIG. 4 is an example of a data insertion operation performed during execution of the stylus device of FIG. 1 according to various embodiments of the present disclosure.

Turning to FIG. 4, shown is an example of a data insertion operation performed by the stylus device 102 involving data captured by the data capture device 112. At the insertion point 202 (FIG. 2) specified earlier by the stylus device 102, the computing device 103 downloads data from the stylus device 102 via a connection established between the computing device 103 and the stylus device 102. As described above, the respective peripheral interfaces 119, 129 of the stylus device 102 and the computing device 103 may establish a wireless connection comprising, for example, a Bluetooth® connection, an IEEE 802.11 connection, a UWB (ultra-wideband) connection, a ZigBee connection, or other connection.

As shown, the transcribed sentence dictated earlier by the user in FIG. 3 is inserted at the insertion point 202 into the blog post. Note that while some embodiments of data capture device 112 incorporate transcription logic, the transcription of human speech may also be performed remotely by a transcription service offered by a remote entity. For some embodiments, the stylus device 102 is configured to connect to the Internet via a WiFi connection, which the data capture device 112 utilizes to obtain a transcription of audio content sent over the air. For such embodiments, the data capture device 112 retrieves the transcribed speech via the WiFi connection and stores the data in the data storage device 117.

Figure 5A:
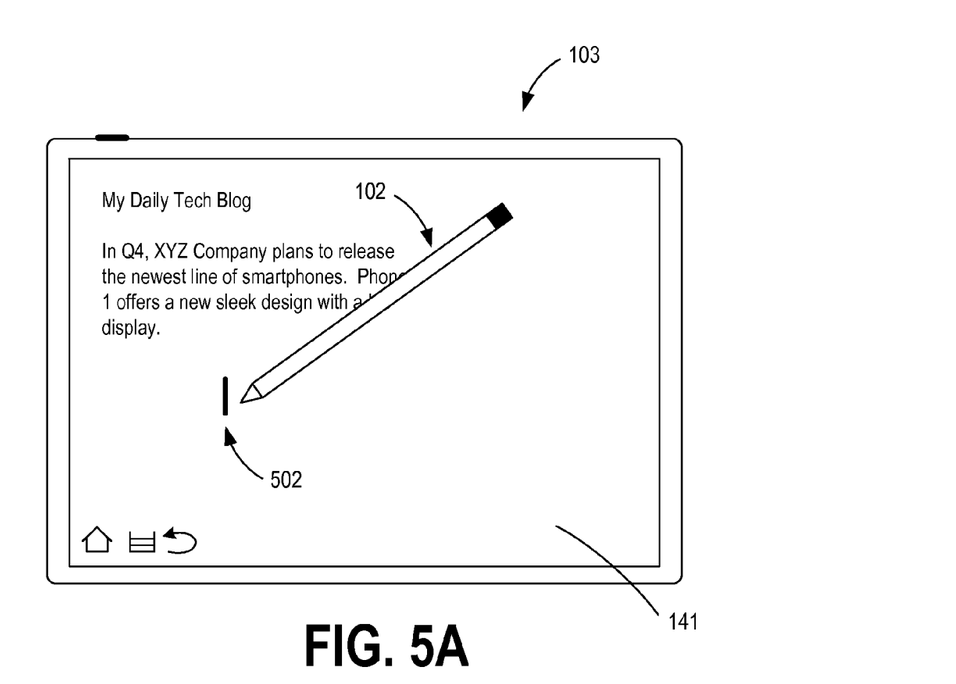
FIGS. 5A and 5B depict another example of a data insertion operation performed during execution of the stylus device of FIG. 1 according to various embodiments of the present disclosure.
Figure 5B:
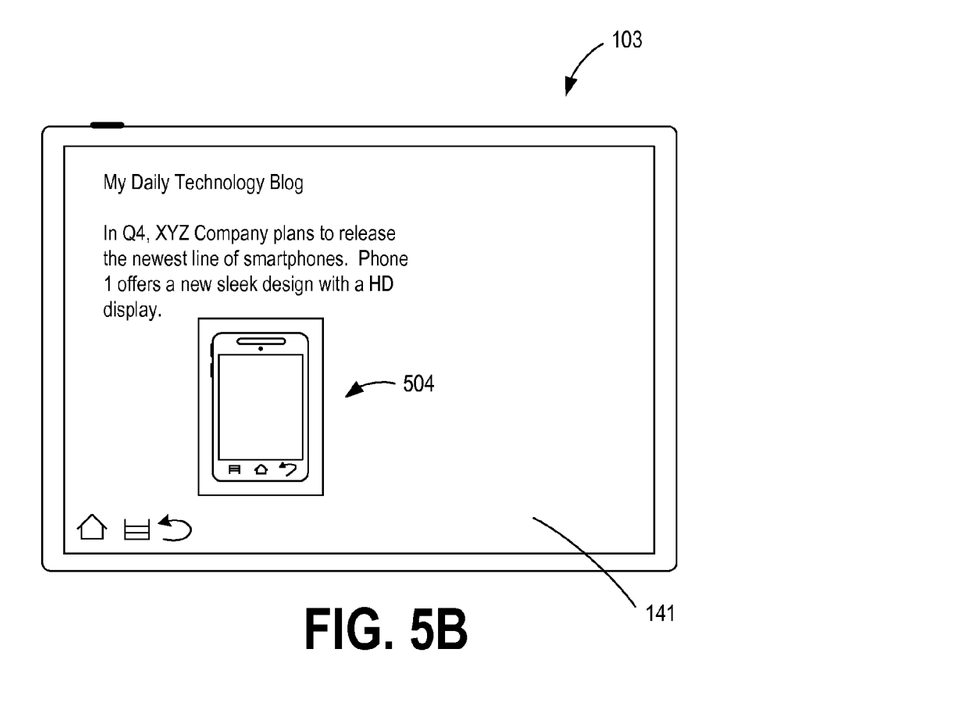

Reference is made to FIGS. 5A and 5B, which illustrate and another example whereby media content is inserted. A user specifies an insertion point 502 by tapping the touchscreen display 141 of the computing device 103. The user may then capture a digital image 504 via a digital camera implemented as part of the data capture device 112 (FIG. 1) in the stylus device 102, where the captured digital image 504 is stored in the data storage device 117 (FIG. 1) as media data 142 (FIG. 1). The stylus device 102 transmits the captured digital image 504 to the computing device 103 over the wireless connection established between the peripheral interfaces 119, 129. The computing device 103 updates the touchscreen display 141 to show the digital image 504 retrieved from the stylus device 102 at the specified insertion point 502. Note that while the non-limiting example depicts a digital image 504 being inserted, other types of media content such as a video clip, an audio clip, and so on, may be inserted as well.

Figure 6:
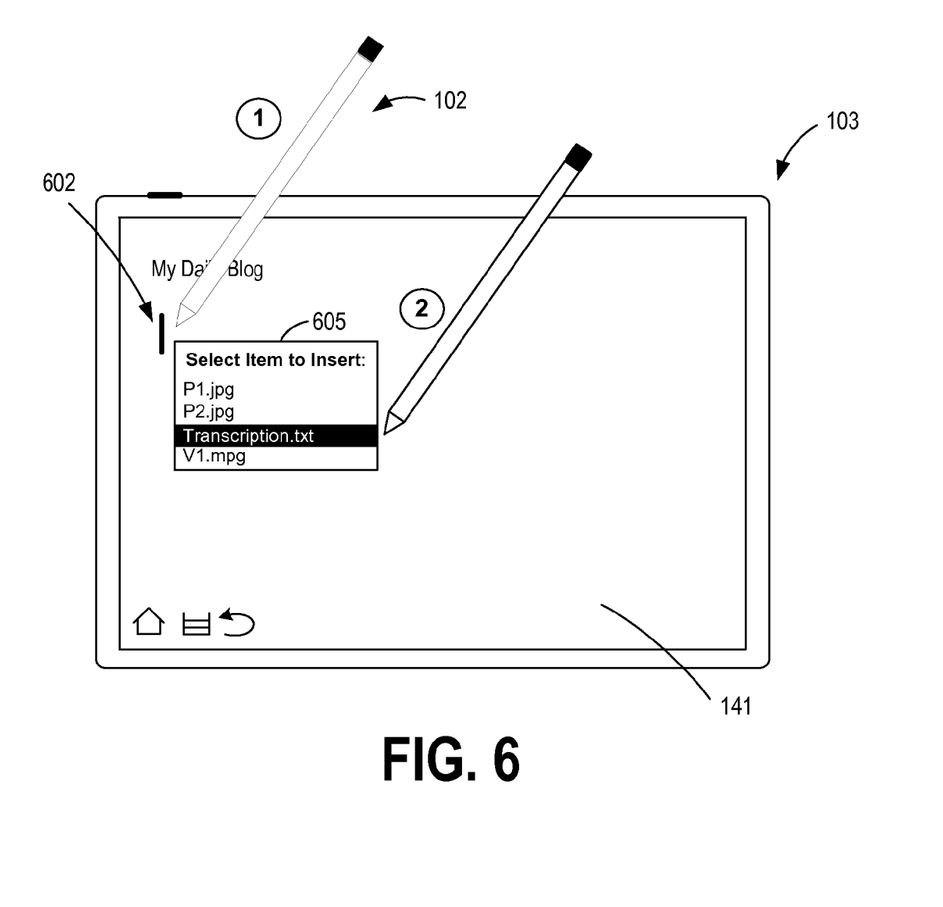
FIG. 6 is a non-limiting example of a selection component generated by the UI generator in the computing device of FIG. 1.

Reference is made to FIG. 6, which illustrates a non-limiting example of a selection component 605 generated by the UI generator 125 in the computing device 103. For some embodiments, the data indexer 115 (FIG. 1) in the stylus device 102 generates/maintains an index of the media content 142 (FIG. 1) stored in the data storage device 117 of the stylus device 102. In accordance with such embodiments, the data indexer 115 transmits an index of available media data 142 to the UI generator 125, which then generates a selection component 605 shown on the touchscreen display 141 of the computing device 103.

For some embodiments, the selection component 605 is triggered when an insertion point 602 is specified by the user using the stylus device 102. In the example shown, the selection component 605 is embodied as a selection menu that lists files currently stored in the data storage device 117 that are available to be retrieved from the stylus device 102. Using the stylus device 102, the user makes a selection from the available media data 142 (FIG. 1) currently stored in the data capture device 112.

Figure 7:
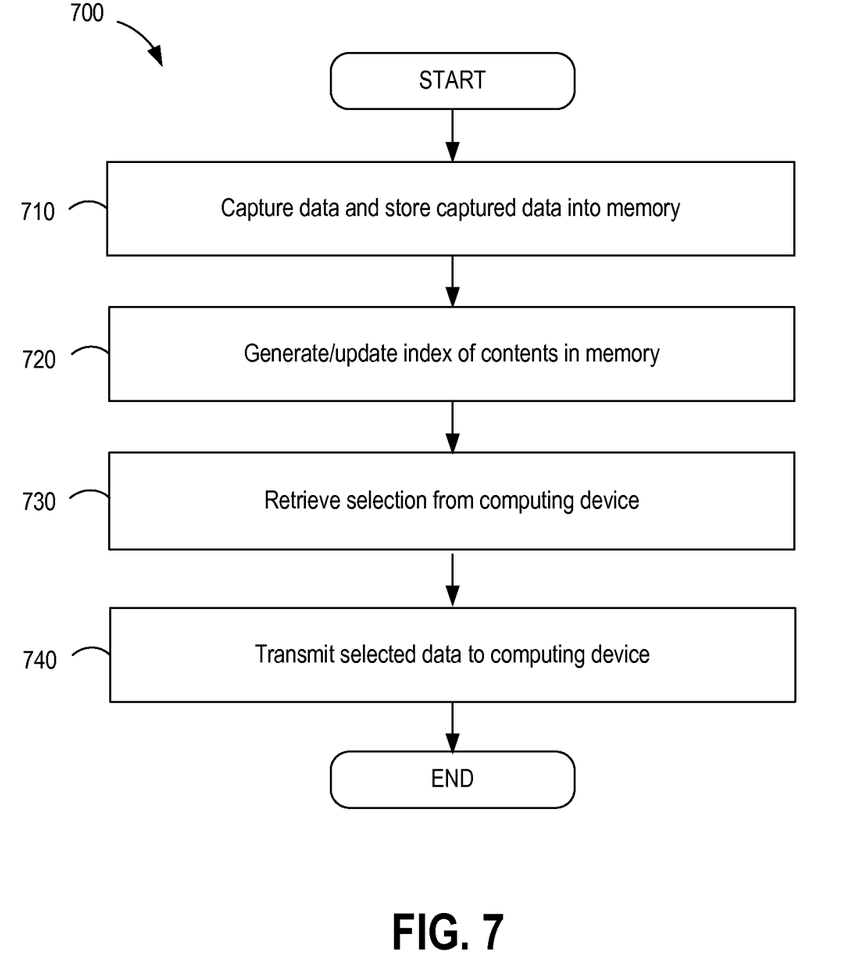
FIG. 7 is a flowchart illustrating examples of functionality implemented as portions of the stylus device of FIG. 1 according to various embodiments of the present disclosure.

Having described the various components for utilizing a stylus device 102 to insert data, a detailed description of the functionality associated with the various components described in connection with FIG. 1 is now provided. Reference is made to FIG. 7, which is a flowchart 700 in accordance with one embodiment for inserting data via a stylus device 102 (FIG. 1). It is understood that the flowchart 700 of FIG. 7 provides merely an example of the many different types of functional arrangements that may be employed to implement the operation of the data capture device 112 (FIG. 1) and the data indexer 115 (FIG. 1) in the stylus device 102. As an alternative, the flowchart of FIG. 7 may be viewed as depicting an example of steps of a method implemented in the stylus device 102 according to one or more embodiments.

Beginning with block 710, the data capture device 112 in the stylus device 102 captures data and stores the data in the data storage device 117 (FIG. 1), where the data comprises, for example, human speech, digital images, audio/video data, and so on. For some embodiments, the stylus device 102 may include a button or other selection means assigned to different functions. For example, one button on the stylus device 102 may be pressed to capture a digital image, while a different button may be pressed to capture a video clip.

In block 720, the data indexer 115 in the stylus device 102 generates or updates an index of the media data 142 (FIG. 1) currently stored in the data storage device 117. In accordance with some embodiments, the data indexer 115 may be configured to periodically transmit a data packet containing the index of the media data 142 to the computing device 103. For other embodiments, the data indexer 115 may be configured to transmit the data packet upon an insertion point being specified by the stylus device 102.

In block 730, the data indexer 115 retrieves the user's selection from the computing device 103. As described earlier in connection with FIG. 6, the user may perform a selection via the selection component 605. The data indexer 115 retrieves the selected content from the data storage device 117, and in block 740, the stylus device 102 transmits the requested data to the computing device 103.

Figure 8:
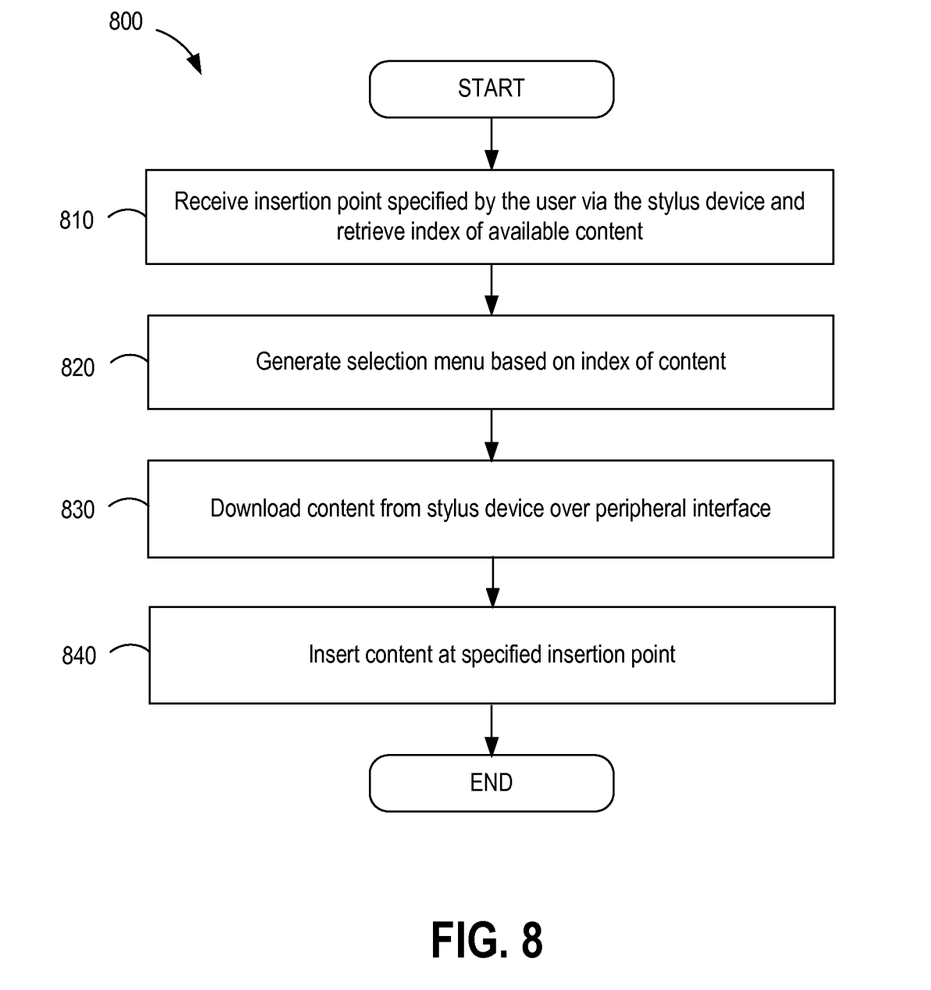
FIG. 8 is a flowchart illustrating examples of functionality implemented as portions of the computing device of FIG. 1 according to various embodiments of the present disclosure.

Reference is made to FIG. 8, which is a flowchart 800 in accordance with one embodiment for inserting data via a stylus device 102 (FIG. 1). It is understood that the flowchart 800 of FIG. 8 provides merely an example of the many different types of functional arrangements that may be employed to implement the operation of the UI generator 125 (FIG. 1) in the computing device 103 (FIG. 1). As an alternative, the flowchart of FIG. 8 may be viewed as depicting an example of steps of a method implemented in the computing device 103 according to one or more embodiments.

Beginning with block 810, the computing device 103 receives an insertion point specified by the user via the stylus device 102. As described above, the user may accomplish this by tapping the touchscreen display 141 (FIG. 1) of the computing device 103. The computing device 103 retrieves an index of the media data 142 (FIG. 1) stored in the data storage device 117 (FIG. 1) of the stylus device 102. As described above, the computing device 103 may be configured to retrieve the index periodically or upon receiving an insertion point.

In block 820, the UI generator 125 generates a selection menu based on the index retrieved from the data indexer 115 (FIG. 1) in the stylus device 102. In block 830, the computing device 103 downloads the selected content from the stylus device 102 over the wireless connection established between the respective peripheral interfaces 119, 129 of the stylus device 102 and the computing device 103. In block 840, the computing device 103 inserts the downloaded content at the insertion point specified by the stylus device 102.

Figure 10:
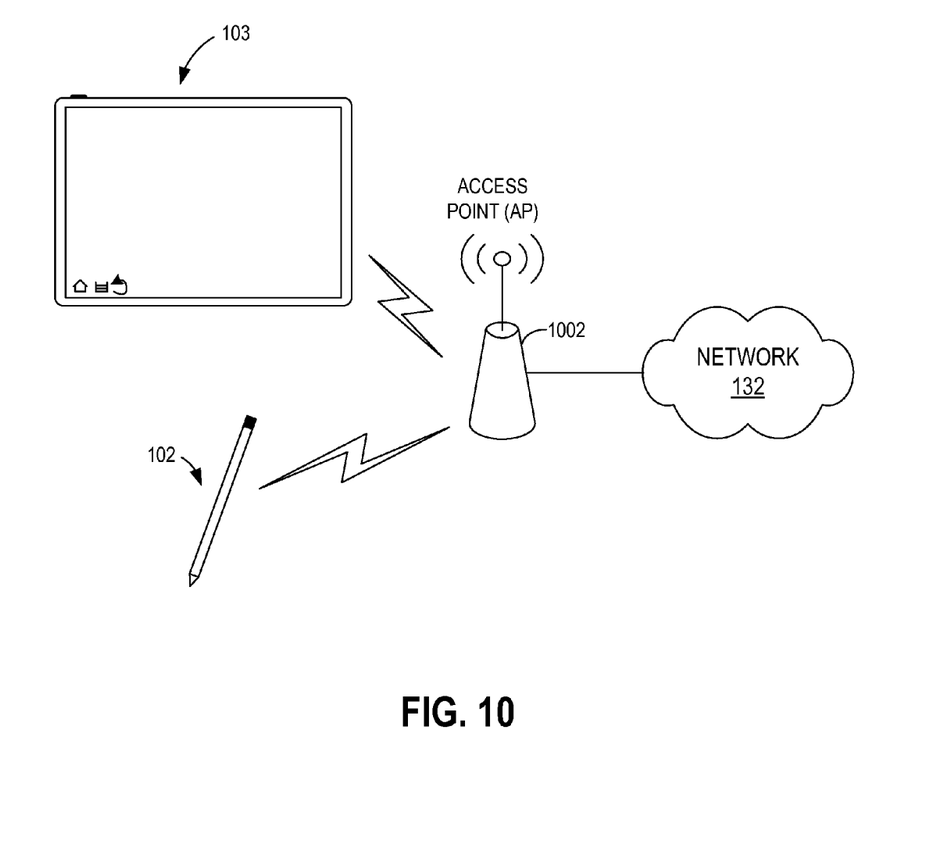
FIG. 10 illustrates an embodiment whereby the stylus device and the computing device of FIG. 1 are coupled to a network via a wireless access point.

Note that while various embodiments are directed to a computing device 103 retrieving content from a stylus device 102, the stylus device 102 may also be configured to update web pages directly over the Internet via a WiFi connection. Reference is made to FIG. 10, which depicts the computing device 103 and the stylus device 102 operating as part of an IEEE 802.11 network whereby the devices 102, 103 are wirelessly coupled via an access point 1002, which provides access to a network 132 such as the Internet.

Figure 9:
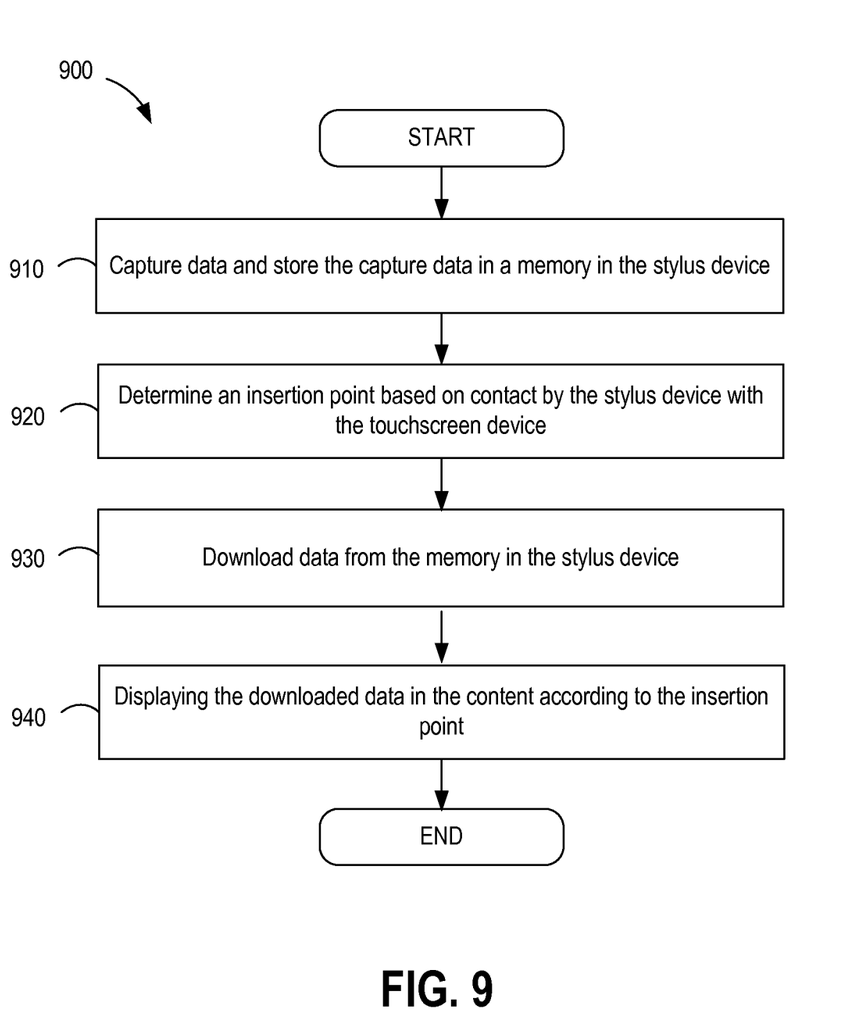
FIG. 9 is a top-level flowchart illustrating examples of functionality implemented as portions of the system of FIG. 1 for inserting data according to various embodiments of the present disclosure.

Reference is made to FIG. 9, which is a flowchart 900 in accordance with one embodiment for inserting data via execution of the various components of the stylus device 102 (FIG. 1) and the computing device 103 (FIG. 1). It is understood that the flowchart 900 of FIG. 9 provides merely an example of the many different types of functional arrangements that may be employed. As an alternative, the flowchart of FIG. 9 may be viewed as depicting an example of steps of a method implemented in the stylus device 102 and the computing device 103 according to one or more embodiments.

In accordance with one embodiment for inserting data, the stylus device 102 begins with block 910 and captures data, which is then stored in the data storage device 117 (FIG. 1) of the stylus device 102. In block 920, the computing device 103 determines an insertion point based on contact by the stylus device 102 with the touchscreen display 141 (FIG. 1) of the computing device 103. In block 930, the computing device 103 downloads data from the data storage device 117 of the stylus device, and in block 940, the computing device 103 displays the downloaded data according to the specified insertion point.

Figure 11:
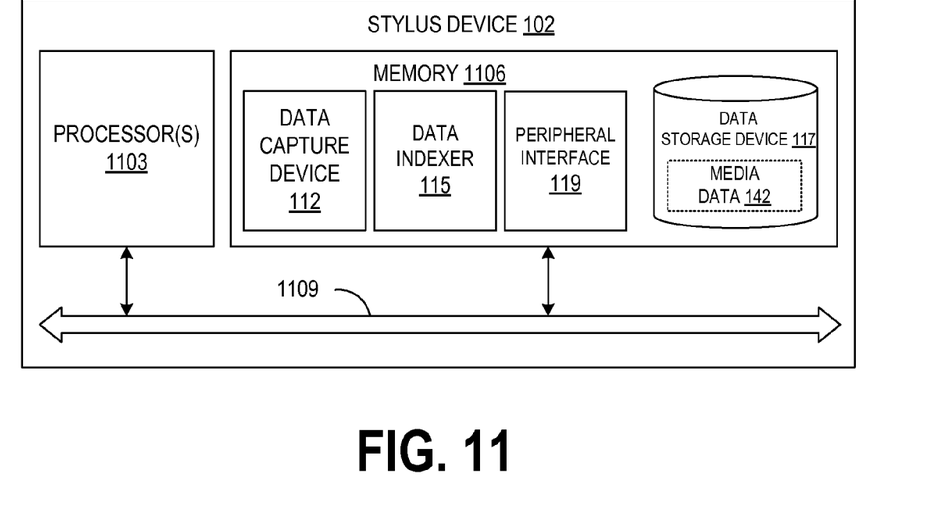
FIG. 11 is a schematic block diagram of the stylus device according to an embodiment of the present disclosure.

With reference to FIG. 11, shown is a schematic block diagram of the stylus device 102 according to an embodiment of the present disclosure. The stylus device 102 includes at least one processor circuit, for example, having a processor 1103 and a memory 1106, both of which are coupled to a local interface 1109. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the data capture device 112, the data indexer 115, the peripheral interface 119, and potentially other applications. The data storage device 117 may be implemented as part of the memory 1106 of the stylus device 102. In addition, an operating system may be stored in the memory 1106 and executable by the processor 1103.

Figure 12:
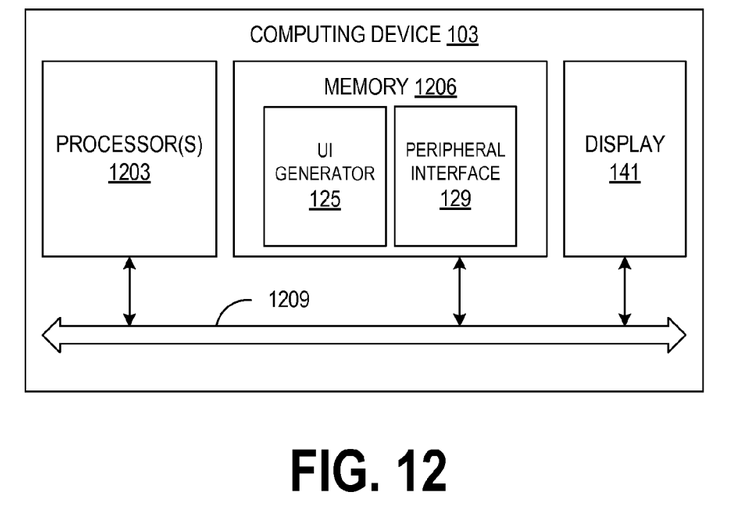
FIG. 12 is a schematic block diagram of the computing device according to an embodiment of the present disclosure.

With reference to FIG. 12, shown is a schematic block diagram of the computing device 103 according to an embodiment of the present disclosure. The computing device 103 includes at least one processor circuit, for example, having a processor 1203 and a memory 1206, both of which are coupled to a local interface 1209. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the UI generator 125, the peripheral interface 129, and potentially other applications. In addition, an operating system may be stored in the memory 1206 and executable by the processor 1203.

It is understood that there may be other applications that are stored in each of the memories 1106/1206 and are executable by the respective processors 1103/1203 as can be appreciated. Where any component discussed herein is implemented in the form of software, any one of a number of programming languages may be employed.

A number of software components are stored in the respective memories 1106/1206 and are executable by the processors 1103/1203. In this respect, the term executable means a program file that is in a form that can ultimately be run by a respective processor 1103/1203. Examples of executable programs may be, for example, a compiled program that can be translated into machine code in a format that can be loaded into a random access portion of a memory 1106/1206 and run by a processor 1103/1203, source code that may be expressed in proper format such as object code that is capable of being loaded into a random access portion of a memory 1106/1206 and executed by a processor 1103/1203, or source code that may be interpreted by another executable program to generate instructions in a random access portion of one of the memories 1106/1206 to be executed by a respective processor 1103/1203, etc.

An executable program may be stored in any portion or component of a respective memory 1106/1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 1106/1206 is defined herein as including both volatile and nonvolatile memory and data storage components. Volatile components are those that do not retain data values upon loss of power. Nonvolatile components are those that retain data upon a loss of power. Thus, each memory 1106/1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components.

In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 1103/1203 may represent multiple processors and each memory 1106/1206 may represent multiple memories that operate in parallel processing circuits, respectively. In such a case, each local interface 1109/1209 may be an appropriate network that facilitates communication between any two of the multiple processors, between any processor and any of the multiple memories, or between any two memories, etc. Such a local interface 1109/1209 may comprise additional systems designed to coordinate this communication, including, for example, performing load balancing. Each processor 1103/1203 may be of electrical or of some other available construction.

Although the components and applications described herein may be embodied in software or code executed by general purpose hardware as discussed above, as an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7-9 show an example of functionality associated with implementation of the various components in the system of FIG. 1. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. Further, in some embodiments, one or more of the blocks shown in FIGS. 7-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. Each may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A system, comprising:
   a stylus device, comprising:
      an input device configured to capture data;
      memory configured to store the captured data;
      logic for transmitting the stored data; and
      logic for maintaining an index of the captured data according to media type; and
   a computing device, comprising:
      a touchscreen display configured to receive an insertion point from the stylus device via the stylus device coming in contact with the touchscreen display,
      the insertion point directly corresponding to a location where the stylus device applies a tap to the touchscreen display,
      wherein the stylus transmits the index to the computing device responsive to the stylus device coming in contact with the touchscreen display;
      a peripheral interface for receiving the transmitted captured data responsive to the touchscreen display sensing the tap applied by the stylus device; and
      an application executable in the computing device, the application comprising:
         logic for receiving the index from the stylus device;
         logic for displaying a user interface according to the received index;
         logic for receiving a selection responsive to the displayed user interface and transmitting the selection to the stylus,
         wherein responsive to receiving the selection, the stylus transmits captured data corresponding to the selection,
         logic that displays the captured data received by the peripheral interface at the insertion point on the touchscreen display.

2. The system of claim 1, wherein the logic that inserts the data is configured to insert the data based on the determined insertion point.

3. The system of claim 1, wherein the input device comprises a microphone.

4. The system of claim 3, wherein the stylus device further comprises logic that transcribes speech captured by the input device and stores the transcribed speech into the memory.

5. The system of claim 3, wherein the stylus further comprises logic that stores media content captured by the digital camera into the memory.

6. The system of claim 3, wherein the stylus device further comprises a stylus peripheral interface configured to establish a connection with the peripheral interface of the computing device.

7. The system of claim 6, wherein the connection comprises a Bluetooth connection.

8. The system of claim 6, wherein the connection comprises an IEEE 802.11 connection.

9. The system of claim 1, wherein the input device comprises a digital camera.

10. The system of claim 1, wherein the user interface comprises a selection component listing on the touchscreen display for selecting data stored in the memory of the stylus device, and wherein items in the selection component listing corresponding to the captured data are arranged in the user interface according to the media type.

11. A method for inserting data into content displayed on a touchscreen display of a computing device, comprising:
   capturing, by a stylus device, data and storing the captured data in a memory in the stylus device;
   maintaining, by the stylus device, an index of the captured data according to media type;
   receiving, by the computing device, an insertion point based on contact by the stylus device with the touchscreen display;
   downloading, by the computing device, the index from the memory in the stylus device responsive to the stylus device coming in contact with the touchscreen display of the computing device;
   displaying, by the computing device, a user interface according to the downloaded index;
   receiving, by the computing device, a selection responsive to the displayed user interface;
   transmitting, by the computing device, the selection to the stylus;
   responsive to receiving the selection, transmitting, by the stylus, captured data corresponding to the selection; and
   displaying, by the computing device, the captured data in the content displayed on the touchscreen display according to the insertion point.

12. The method of claim 11, wherein capturing and storing data comprises:
   capturing human speech by a microphone implemented in the stylus device;
   transcribing, by the stylus device, the captured human speech; and
   storing the transcribed speech in the memory.

13. The method of claim 11, wherein capturing and storing data comprises:
   capturing, by an integrated digital camera in the stylus device, media content, wherein the media content comprises one of: digital images and a video; and
   storing the captured media content in the memory.

14. The method of claim 11, further comprising establishing a wireless connection between the stylus device and the computing device, the wireless connection comprising one of: a Bluetooth connection and an IEEE 802.11 connection.

15. A system, comprising:
   a stylus device, comprising:
      an input device configured to capture data, wherein the data comprises at least one of: speech input, a digital image, and video;
      memory configured to store the captured data;

logic for generating an index of the captured data according to media type;

logic for transmitting the stored data;

a computing device, comprising:

a touchscreen display configured to receive an insertion point from the stylus device via the stylus device coming in contact with the touchscreen display, the insertion point directly corresponding to a location where the stylus device applies a tap to the touchscreen display, wherein the stylus transmits the index to the computing device responsive to the stylus device coming in contact with the touchscreen display;

a stylus interface for establishing a wireless connection with the stylus device, the stylus interface further configured to receive the transmitted captured data and the index; and an application executable in the computing device, the application comprising:

logic that generates a user interface on the touchscreen display according to the index responsive to the touchscreen display sensing the tap applied by the stylus device;

logic that receives a selection responsive to the user interface and transmits the selection to the stylus, wherein responsive to receiving the selection, the stylus transmits captured data corresponding to the selection;

and logic that inserts the captured data received by the stylus interface at the insertion point on the touchscreen display.

16. The system of claim 15, wherein the computing device comprises one of: a smartphone and a tablet computing device.

17. The system of claim 15, wherein the wireless connection comprises one of: a Bluetooth connection and an IEEE 802.11 connection.

\* \* \* \* \*